(No Model.)
H. STEPHAN & J. SCHÜTZ.
CAR FENDER.
No. 533,096. Patented Jan. 29, 1895.
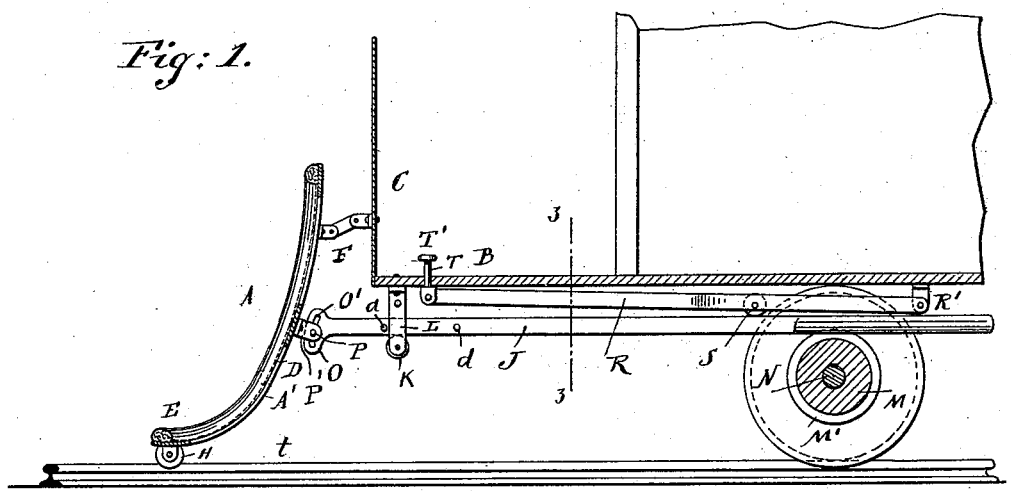
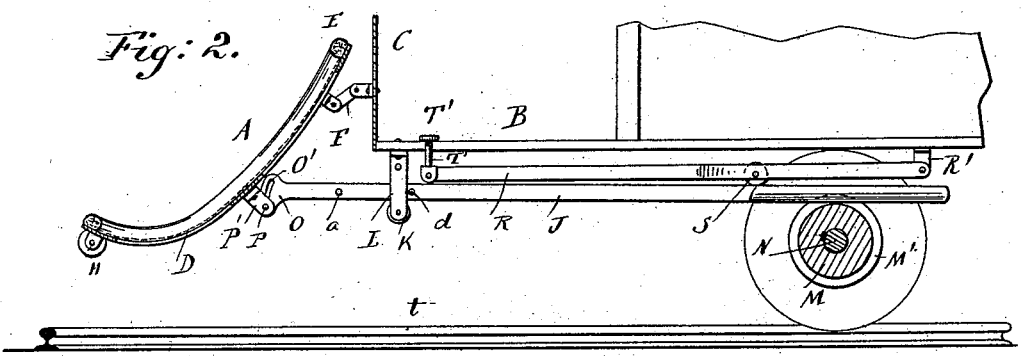
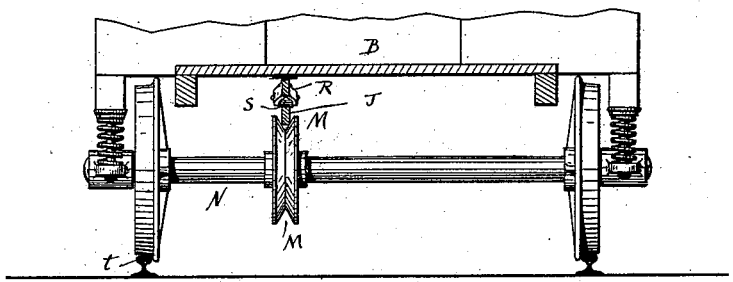

UNITED STATES PATENT OFFICE.

HERMANN STEPHAN, OF JERSEY CITY, NEW JERSEY, AND JOHN SCHÜTZ, OF NEW YORK, N. Y., ASSIGNORS OF ONE-HALF TO GEORGE F. OF AND JULIUS WEINSTOCK, OF NEW YORK, N. Y.

CAR-FENDER.

SPECIFICATION forming part of Letters Patent No. 533,096, dated January 29, 1895.

Application filed September 15, 1894. Serial No. 523,124. (No model.)

*To all whom it may concern:*

Be it known that we, HERMANN STEPHAN, residing at Jersey City, in the county of Hudson and State of New Jersey, and JOHN SCHÜTZ, residing at New York city, in the county and State of New York, citizens of Germany, have invented certain new and useful Improvements in Car-Fenders, of which the following is a specification.

This invention relates to improvements in fenders for electric and cable cars.

The object of our invention is to provide a new and improved fender for electric and cable railway cars, which fender is so constructed that the motorman or gripman can readily bring the same into such a position that it catches the person that is struck and thrown down by the front part of the car, thus preventing the body from being maimed or bruised by the wheel guards, the bottom of the car body or the wheels.

The invention consists in the combination with a car of a fender hung on the end of same and mechanism for swinging the lower part of the fender to the front by means of power derived from the moving car.

The invention also consists in the construction and combinations of parts and details as will be fully described hereinafter and finally pointed out in the claims.

In the accompanying drawings forming a part of this specification and in which like letters of reference indicate like parts in all the views, Figures 1 and 2 are longitudinal sectional views of our improved fender, the mechanism for operating the same and of part of the car to which the same are attached. Fig. 3 is a vertical transverse sectional view of the same on the line 3—3 of Fig. 1.

The fender A, which has the width of the car platform B or dash board C is composed of a strong metal frame A' covered with wire or rope netting D, the fender being curved downward and outward from its upper to its lower end and the lower part having an increased outward curvature.

A roll cushion E, of leather, rubber cloth, or other suitable material, is fastened on the front of the fender along all the edges, for the purpose of preventing persons being cut or bruised when struck or caught by the fender.

The fender is hung near its upper end by means of links F, on the front of the dash board C, so as to permit the car to rock up on and down without imparting the same motions to the fender.

The fender is provided at each side with a small roller or wheels H, which wheels run on the track rails $t$ and serve to hold the bottom edge of the fender about two inches from the pavement.

A bar J is mounted to slide longitudinally on the under side of the car and rests upon a roller K mounted in a hanger L, projecting downward from the car floor, near the end of the same and also rests upon a friction wheel M fixed on the car wheel axle N, which wheel M, has a V shaped circumferential groove M' for receiving part of the bar J, which is shaped correspondingly. The bar J, is provided at its front end with a head O, having a downwardly extending, slightly inclined slot O' through which a pin P passes, that is held in lugs P' projecting from the back of the fender. $a$ and $d$ are check pins for limiting the throw of said bar J.

A lever R has its rear end pivoted at R' to the under side of the car floor and is located directly above the bar J. A roller S is mounted in a longitudinal vertical slot of said lever R' and can bear on the bar J when the lever R is depressed. A pin T having a head T' projects from the front end of the lever R through the car platform B at the front end of the same. A contrivance, such as described above, is provided at each end of the car.

The operation is as follows: The fender A is normally in the position shown in Fig. 1. When a person standing between the rails or running between the rails or in any other way coming in front of the car is struck by the bottom of the fender he is thrown upon the fender. The motorman or gripman at once depresses the pin T whereby the lever R, is depressed and its roller S pressing on the bar J presses the latter friction tight upon the wheel M, fixed on the car axle N, and thereby the said bar J is moved by friction from the wheel R toward the front of the car and brings the fender into the position shown in Fig. 2, the fender thus forming a pocket or scoop that holds the person and from which said person cannot roll off. The fender remains in the position shown in Fig. 2 until the car is brought to a stand still.

Having thus described our invention, what we claim as new, and desire to secure by Letters Patent, is—

1. The combination with a car of a fender hinged to the end of the same, a bar connected with the fender, a friction wheel on the car axle and means for pressing said bar on said friction wheel substantially as herein set forth.

2. The combination with a car, of a fender hinged on the end of the same, a bar connected with said fender, a friction wheel fixed on the car axle and a lever for pressing said bar up on the friction wheel, substantially as herein set forth.

3. The combination with a car, of a fender hung on the end of the same, a bar connected with the fender, a friction wheel fixed on the car axle, a lever pivoted to the under side of the car floor above said bar and a roller on said lever, substantially as herein set forth.

4. The combination with a car of a fender hung on the end of the same, a bar connected with the fender, a friction wheel on the car axle, a lever pivoted to the under side of the car floor, above said bar and a pin projecting from the free end of said bar through the car floor substantially as herein set forth.

5. The combination with a car, of a fender hung by means of links on the end of the same, a friction wheel on the car axle, a longitudinally sliding bar above said friction wheel a slotted head on the front end of said bar, a pin passing from the fender through said slot and means for pressing the bar on said friction wheel, substantially as herein set forth.

6. The combination with a car, of a fender hung on the end of the same, a bar connected with said fender, a hanger on the car floor and through which hanger said bar passes a friction wheel fixed on the car axle and means for pressing the bar on said friction wheel substantially as herein set forth.

Signed at New York, in the county of New York and State of New York, this 7th day of September, A. D. 1894.

HERMANN STEPHAN.
JOHN SCHÜTZ.

Witnesses:
OSCAR F. GUNZ,
D. PETRI-PALMEDO.